United States Patent [19]
McNeil

[11] 3,866,271
[45] Feb. 18, 1975

[54] BONE HOLDING MECHANISM

[75] Inventor: Gary McNeil, Holland, Mich.

[73] Assignee: Prince Corporation, Holland, Mich.

[22] Filed: Oct. 26, 1971

[21] Appl. No.: 192,236

[52] U.S. Cl. .................................. 17/1 G, 17/46
[51] Int. Cl. ........................................ A22c 17/04
[58] Field of Search ................... 17/1 R, 1 G, 46

[56] References Cited
UNITED STATES PATENTS

| | | | |
|---|---|---|---|
| 3,457,586 | 7/1969 | Zwiep et al. | 17/1 G |
| 3,570,050 | 3/1971 | Draper et al. | 17/1 G X |
| 3,581,337 | 6/1971 | Tonsum et al. | 17/1 G |
| 3,644,963 | 2/1972 | Terranova | 17/46 |
| 3,708,828 | 1/1973 | Cain et al. | 17/1 G |

*Primary Examiner*—Hugh R. Chamblee
*Attorney, Agent, or Firm*—Price, Heneveld, Huizenga & Cooper

[57] ABSTRACT

This disclosure relates to a bone holding mechanism for supporting a bone by one end thereof while meat stripping operations are performed. The mechanism comprises a bone encircling and holding member having a suspended fixed jaw and a piston actuated movable jaw mounted therein. Upon insertion of a bone, the piston operated jaw is moved toward the fixed jaw to hold the bone securely from rotational and longitudinal movement while meat stripping operations are being performed.

12 Claims, 8 Drawing Figures

PATENTED FEB 18 1975　3,866,271

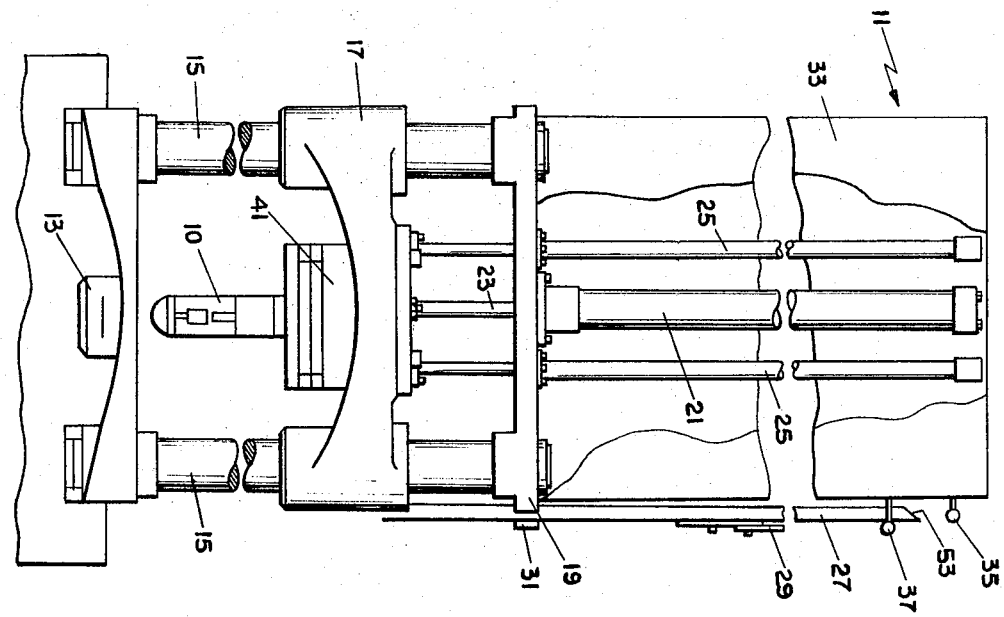

BONE HOLDING MECHANISM

BACKGROUND OF THE INVENTION

In the U.S. Pats. No. 3,457,586, T. C. Zwiep, et al., issued July 29, 1969; 3,486,187, T. C. Zwiep, et al. issued Dec. 30, 1969; and 3,522,738, T. C. Zwiep, et al., issued Aug. 4, 1970, various methods and apparatus are disclosed to remove bones from animal meat cuts, such as hams. U.S. Pat. No. 3,457,586 specifically discloses a deboning apparatus wherein the meat cut to be deboned is held by an end of the bone so that the bone is restrained from longitudinal and rotational movement while a rotating dull-edged plow member is urged against and along the length of the bone such that the plow member moves away from the held end of the bone.

A divisional application of U.S. Pat. No. 3,457,586 filed Apr. 28, 1969, Ser. No. 819,813, entitled BONE HOLDING MECHANISM now U.S. Pat. No. 3,609,797 discloses bone holding chuck mechanisms which may be utilized in the above-described deboning apparatus. The structures disclosed therein are adapted to hold the expanded end portion of the tibia bone in a wedged-shaped opening. The bone is restricted from longitudinal and rotational movements while the meat is being removed. Of the several embodiments of bone holding devices shown, each requires that the bone be inserted and positioned manually within the chuck to the most desirable holding position. It is also necessary to have an assortment of various sized bone chucks to accommodate varying sizes of bones.

A copending, commonly assigned patent application, Ser. No. 123,246, filed Mar. 11, 1971, entitled BONE HOLDING MECHANISM now U.S. Pat. No. 3,708,828 also discloses bone holding chuck mechanisms which may be utilized with the above-described deboning apparatus. The bone holding structures described in this copending application provide and disclose mechanisms which have a movable jaw to accommodate bones of varying sizes. Upon insertion of a bone between the jaws, the jaws are automatically moved toward a closed position as a control trigger mechanism trips a jaw restraining or locking means to prevent the jaws from opening. Biasing means move the jaws toward a closed position holding the bone to prevent its rotation. At the completion of the deboning operation, a cam mechanism releases the bias on the jaws and on the jaw restraining and locking means allowing the bone to be removed. In one embodiment of the invention, a sliding gate responsive to movement of the trigger mechanism, moves over the jaws and provides an additional gripping action on the bone. At the completion of the deboning operation, the gate returns to its first position, and through a plurality of cam actuating surfaces mounted therein, the control mechanism on the jaw restraining means is reset, and the bone is released from the jaws.

While each of the above holding devices are reasonably easy to load and unload and are vast improvements over the earlier prior art holding devices which tended to crush the bone, it now remains even more desirable to provide a holding mechanism which will automatically adjust itself to varying sized bones, will grip the bone without damage, and will release the bone upon completion of the operations being performed thereon.

The earlier devices were not readily adapted to automatic processing equipment in that varying sizes were required to accommodate varying sized bones. The device disclosed in the above-mentioned copending application was and is a significant step forward in the bone holding art as it automatically adjusted itself to varying sized bones. It does, however, suffer from the drawback that it has a considerable number of moving parts which are subjected to wear and breakage. A bone placed therein must be raised slightly from the vertical for positioning above its upwardly and outwardly extending jaw members. In addition, bone holding devices of that type are relatively expensive to manufacture and to maintain.

SUMMARY OF THE INVENTION

According to this invention, there is provided a mechanism for holding the exposed portion of a bone from longitudinal, lateral, and rotational movement while deboning operations are being performed.

The holding structure is generally cylindrical in shape, with an internally formed cylinder having a piston assembly mounted therein. Inlet and outlet ports are provided for connection to a pressure source and are applied to either side of the movable piston to control its direction of movement. An extending piston rod controls the movement of a hinged movable jaw assembly which is movable toward a suspended fixed jaw formed within the cylindrical housing. The piston is moved in a first direction to close the jaws during deboning operations and is moved in a second direction to release the jaws and the bone held therein at the completion of the deboning operation. The entire apparatus is adapted for convenient mounting on a deboning apparatus.

OBJECTS OF THE INVENTION

By various aspects of this invention, one or more of the following or other objects can be obtained.

It is a primary object of this invention to provide an improved bone holding mechanism to support the end of a bone while the meat is being stripped therefrom.

It is another object of this invention to provide a bone holding mechanism wherein the bone is firmly restrained from longitudinal and rotational movement during automated deboning operations.

It is another object of this invention to provide a bone holding mechanism for supporting bones in a meat stripping operation wherein the bones are quickly and easily loaded into the mechanism and removed therefrom following the meat stripping operation.

It is another object of the invention to provide a bone holding mechanism wherein the bone is inserted laterally along a vertical plane into the holder thereby facilitating automated loading procedures.

It is another object of this invention to provide a bone holder having a minimal number of moving parts yet one which will automatically adjust itself to bones of varying size.

Other aspects, objects, and the several advantages of this invention will become apparent to one skilled in the art from a study of this disclosure, the drawings, and the appended claims.

BRIEF DESCRIPTION OF THE DRAWINGS

The invention will now be described with reference to the accompanying drawings in which:

FIG. 2 is a plan view illustrating the bone holder mounted in a supporting framework;

FIG. 5 is a cross-sectional view like FIG. 3 illustrating the bone holder in a closed, bone holding position;

In accordance with the invention, the bone holder is utilized for holding the tibia bone of an animal meat cut in a position where the meat is freely suspended from the end of the tibia bone. The bone holder of this invention is particularly useful with deboners such as disclosed in the above-mentioned, commonly assigned U.S. Pat. No. 3,457,586, wherein a stripping cone containing dull-edged plow members rotate about the bone and are urged against the bone while the stripping cone is moved along the bone to plow the meat intact away from the bone. The bone holder has a clamping means adapted to bear against an expanded end portion of the bone such that the bone is restricted from relative longitudinal movement away from the chuck when positioned therein. The clamping surface has means for preventing relative rotation between the chuck and the bone while the stripping operations are being performed. Means are also provided for permitting the insertion and removal of the bone into the holder.

Figure 1:
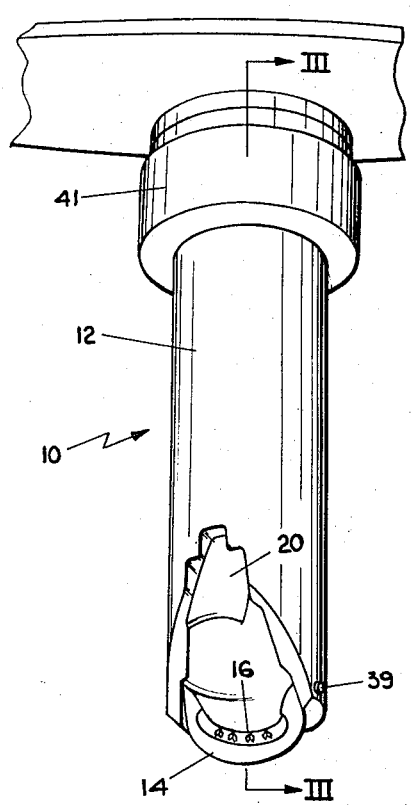
FIG. 1 is a perspective view of the bone holder of the invention.

Referring now to the drawings, FIGS. 1 and 2 illustrate a bone holding chuck assembly 10 adapted for mounting on a bone support arm of a deboning machine. The bone holder may be mounted, for example, on the arm of a deboning machine of the type disclosed in the above-mentioned U.S. Pat. No. 3,457,586. In that patent, the bone and holder remain relatively stationary while dull-edged plow members are urged downwardly along the length of the bone.

In the preferred embodiment disclosed herein, and as illustrated in FIG. 2, the plow members are fixed in position and the bone is moved upwardly through the plow members to remove the meat therefrom. This is conveniently accomplished by means of a tower assembly 11 which is adapted at its lower extremity for mounting a plow member 13 of the type disclosed in the above-mentioned patent. A pair of support columns 15 extend upwardly parallel to each other from the plow member. The bone holder 10 is mounted for vertical movement between the support columns in a carriage 17. An upper support and spacer bracket 19 is fixed to the upper extremity of the support columns 15 and supports a piston assembly 21. A piston rod 23 movable within the piston assembly 21 is connected to the carriage 17 to effect movement of the carriage and the attached bone holder in a manner to be described hereinafter. A pair of telescoping fluid pressure supply tubes 25 are also mounted on the bracket 19 and connected with the bone holder 10 through the carriage 17.

An upwardly extending actuator rod 27 having switch actuating means 29 mounted thereon is fixed on one side of the carriage 17 for movement therewith. A guide member 31 on the side of the bracket 19 holds the actuator rod to insure its upward movement with the carriage 17.

The extreme upper portion of the tower 11 may be enclosed by a cover 33 which also serves as a convenient mounting surface for a pair of limit switches 35 and 37, the function of which will be described more fully hereinafter.

It may be readily understood from the disclosure thus far presented that the jaw 10 mounted on the carriage 17 is movable by the piston 21 and its rod 23 upwardly and downwardly along the support columns 15. At its lower limit of travel, the jaw is positioned through the plow member 13 where a bone, from which the meat is to be removed, may be inserted thereon and the jaw is moved upwardly by the piston through the plow member where the meat is removed in a manner as described in the above-mentioned U.S. Pat. No. 3,457,586.

Figures 3, 4:
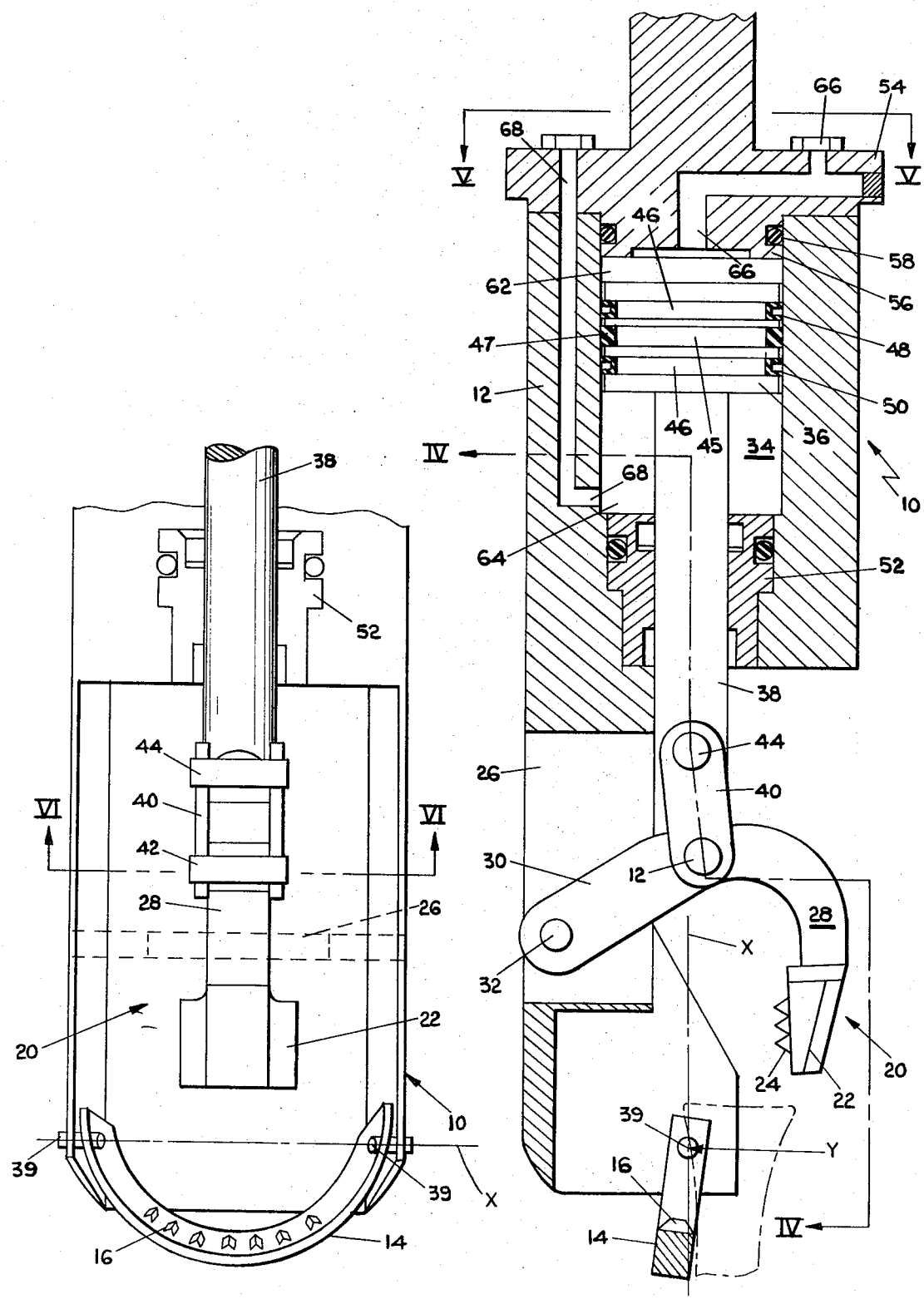
FIG. 3 is a cross-sectional view taken along the plane III—III of FIG. 1 illustrating the bone holder in an open, or bone receiving position.
FIG. 4 is a cross-sectional view taken along the plane IV—IV of FIG. 3.

Referring now to FIGS. 3 and 4, the bone holder of the invention is illustrated in an open or bone receiving position. This is the position the bone holder will assume when the piston rod mounted on the tower assembly is extended and the carriage is moved to its lower limit of travel. The bone holder is then extended through the deboning member 13 to receive a bone.

The bone holding mechanism is essentially a cylindrical-shaped support housing 12 having a pair of cooperating jaw members 14 and 20 mounted therein. For convenience, the jaws will be referred to as the fixed jaw 14 and the movable jaw 20. The fixed jaw 14 is arc-shaped conforming essentially to the inner diameter of the cylindrical support housing 12. The inner portion of the arc, which when in operation will contact the bone, is provided with a knurled or sharpened serrated surface 16. The fixed jaw is further pivotally mounted within the holder about the axis X of a pair of pivot pins 39 so that in a bone-receiving position as illustrated in FIGS. 3 and 4, the jaw pivots and hangs downwardly and so that when pivoted to various positions, such as the position of FIGS. 3 and 5, its gripping serrated surface 16 is located at different distances from the plane Y on which the axis X is located and which generally extends in the same direction as the bones to be held by the jaws. This construction aids self-alignment as is described hereinafter. The knurled surface 16 prevents rotational and lateral movement of the bone when the cooperating movable jaw 20 is urged against the bone in a bone-holding position (FIG. 5).

The movable jaw assembly 20 is provided with a cooperating clamping surface 22 and has a knurled or serrated face portion 24. The movable jaw is pivotally mounted in the base member and is adapted for movement toward the fixed jaw to assume a bone-holding position (FIG. 5).

The movable jaw assembly 20 is essentially C-shaped, with one of its ends or legs 28 carrying the clamping surface 22 while the opposite end or leg 30 is pivotally mounted in an elongated opening 26 in the base 12 (FIGS. 3, 4, 5, and 6). The pivotable connection is made by means of a pivot pin 32 extending through the opening 26 and passing through the hole in the leg 30 in the movable jaw assembly.

The end of the base 12 opposite of the jaws 14 and 22 is provided with a centrally located laterally extending chamber 34. A movable piston assembly 36 is positioned for movement within the chamber 34 and has a piston rod 38 extending downwardly and out of the cylinder toward the movable jaw. A connecting link member 40 is utilized to connect the extending piston rod 38 to the leg 30 of the C-shaped movable jaw assembly 20. The link 40 is fixed to the jaw 20 and piston rod 38 by means of pins 42 and 44 to allow a pivotal connection so that when the piston rod 38 is extended and the jaw is moved downwardly, the clamping surfaces 22 will move downwardly and toward the fixed jaw 14 to assume the position shown in FIG. 5.

The piston 36 is provided with a plurality of radial grooves 46 in which are placed an equal number of sealing rings. In the embodiment illustrated, the rings are of the type known as "U" cup rings which provide an excellent seal between the piston and cylinder in the presence of pressure. The upper ring 48 is inserted so that the opening of the U faces upwardly while the lower ring 50 is placed so that the opening in the U faces downwardly. A guide ring 47 is positioned in a groove 45 between rings 48 and 50 to prevent wear and galling of the cylinder when the end of the piston rod is side loaded. The end of the cylinder through which the piston rod 38 passes is provided with a stuffing box assembly 52 to prevent leakage and loss of pressure along the piston rod.

The upper end of the cylinder 34 is closed with an end cap 54 having a downwardly extending central projection 56 which extends slightly into and forms the top of the cylinder. A pressure-tight seal is formed by a conventional O ring 58. The cap is secured to the base 12 by a plurality of conventional fastening means such as screws 60 (FIG. 5).

The end cap 54 and the stuffing box 52 completely close the ends of the cylinder 34 and define the upper limit of travel of the piston 36 within. The cylinder chamber is essentially divided into an upper section 62 located above the piston 36 and a lower section 64 located below the piston.

Figure 6:
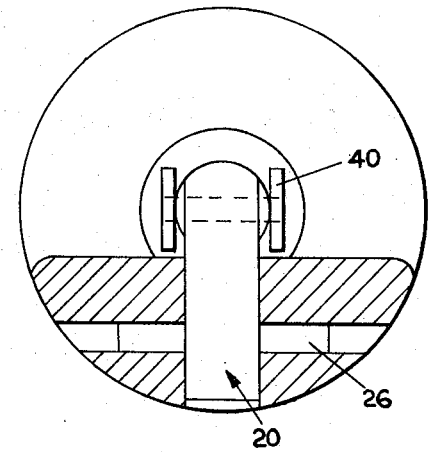
FIG. 6 is a cross-sectional view taken along the plane VI—VI of FIG. 4.

Fluid pressure ports 66 and 68 are provided into the upper and lower sections of the cylinder. The ports are connected through supply lines 25 (FIG. 2) through limit switch valves 35 and 37 to a source of fluid pressure (not shown). Referring specifically to FIG. 6, the top cap 54 is equipped with a pair of oppositely directed ears 72 which are provided to mate with corresponding openings in the collar 41 (FIGS. 1 and 2) which may be fixed to the bone holding arm of the previously mentioned deboning mechanism or is fixed to the carriage 17 illustrated in FIG. 2. Actually, the upper configuration of the top cap may take any of a number of shapes corresponding to the mounting surface of the bone holding arm. In some applications, it is desirable to pendulously support the holder while in other applications, it may be "hard" mounted.

Figure 7:
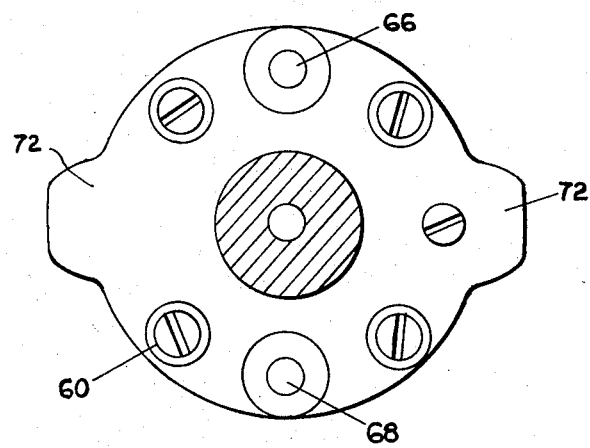
FIG. 7 is an end view taken along the plane VII—VII of FIG. 3.
Figure 8:
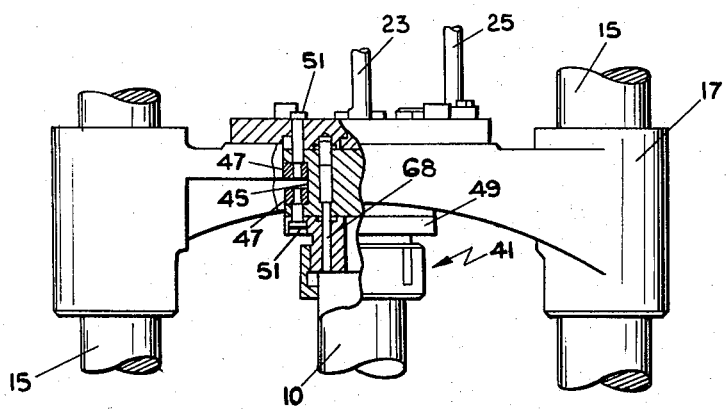
FIG. 8 is a view partially in section illustrating the mounting of the bone holder in a deboning apparatus.

Referring briefly to FIG. 8, the bone holder 10 is preferably mounted to the carriage 17 by means of collar 41. The collar is fixed to the carriage 17 by a flexible connector member 43 which may be formed of urethane or like hard, flexible material. The connector 43 is circular in shape and has a recess or groove 45 provided in its outer diameter. Mounting rings 47 are positioned within the groove and the connector is fixed to the carriage and to a collar retainer 49 by conventional fastening means such as screws 51 passing through the collar retainer and carriage into the mounting rings. The collar 41 is of conventional "quick lock" design keyed to prevent improper assembly. The inner surface of the collar is adapted to engage the extending ears 72 (FIG. 7) on the top of the bone holder 10. When the bone holder is connected to the carriage through the collar and connector, the fluid supply lines 25 are connected through openings in the connector to the ports 66 and 68 in the bone holder.

OPERATION

Referring again to FIGS. 3 and 5, the operation of the bone holding mechanism of the invention will be described in detail. The jaw assembly 20 is moved to an open position with respect to the fixed jaw 14 by the application of a suitable source of pressure applied through one of the supply lines 25 to the port 68 into the lower cylinder section 64. Pressure in this section causes the piston 36 to move upwardly toward the top cap 54. The corresponding movement of the piston rod 38 acting through the link 40 causes the movable jaw 20 to pivot around pin 32 thereby opening the jaws.

At this point, the piston rod 23 has been fully extended from the cylinder 21 causing the bone holder 10 to be extended through and below the meat removing plow member 13 (FIG. 2). The expanded end of the tibia bone is then inserted into the bone holder (toward the left as viewed in FIGS. 3 and 5) contacting the fixed jaw causing it to pivot upwardly away from the movable jaw (FIG. 5). Pressure is then applied through the port 66 into the upper portion 62 of the cylinder chamber. At the same time the pressure is applied to the upper section 62, the pressure from the lower section 64 is released and vented to the atmosphere through suitable conventional valving arrangements (not shown). As pressure is applied, the piston 36 moves downwardly thereby causing a corresponding downward movement of the piston rod 38. Movement of the piston rod through the linkage 40, causes the movable jaw to pivot about pin 32 and assume the closed position shown in FIG. 5 to thereby tightly grip the bone between the jaws 22 and 14. The serrated portions 16 and 28 on the jaws prevent rotational and longitudinal movement of the bone held therebetween. In contrast to the previously described prior art bone holding mechanism which all require a certain amount of "fitting" to maintain the bone in the most desirable holding position, the present invention by means of the pivoted fixed jaw 14 in cooperation with the movable jaw 20 allows the bone to automatically assume the most desirable and positive bone holding position.

As illustrated in FIGS. 4 and 5, when the movable jaw is opened, it swings upwardly and away from the fixed jaw 14 thereby providing a large opening in the face of the fixed jaw to receive the bone. The expanded end of the bone may be inserted into the holder such that as it contacts the fixed jaw, the fixed jaw pivots upwardly and toward the rear of the bone holder (to the left as viewed in FIGS. 3 and 5). As the movable jaw is moved downwardly, it swings in an arc and grasps the side of the bone opposite the fixed jaw to securely hold the bone between the fixed and movable jaws.

The suspended fixed jaw combined with the wide opening movable jaw allows the insertion of a bone into the bone holder in almost any orientation of the bone. This feature greatly facilitates the use of the bone-holding apparatus in conjunction with automated loading equipment.

As the jaws are closed, the deboner 13 of the above-mentioned U.S. Pat. No. 3,522,738 for T. C. Zwiep, et al., issued Aug. 4, 1970, is set into motion; pressure is applied moving the piston rod 21 into cylinder 23 causing an upward movement of the carriage 17, drawing the bone through the deboning mechanism to strip the meat away from the bone.

As the bone is moved upwardly through the deboner, the activator rod 27 is also moving upwardly until the cam 29 on the rod contacts limit valve switch 37. Valve 37 opens applying pressure to the opposite end of the piston 21 and the bone and jaw are moved back through the deboner 13. When the bone holder reaches its lower limit of travel, the pressure is again released from the upper cylinder chamber 62 of the bone holder 10 and pressure is applied to the lower chamber section 64 to move the piston 38 upwardly within the chamber causing a corresponding upward movement of the piston rod and resulting in the opening of the jaws. The bone falls away and the jaws again assume a bone receiving position.

From the foregoing specification and drawings, it will be readily apparent to those skilled in the art that this invention provides a greatly improved bone holding mechanism for use with automated deboning machines wherein bones held thereby are firmly and positively restrained from longitudinal and rotational movement. Because of the unique jaw structure including the pivoted fixed jaw and the movable jaw, the apparatus automatically adjusts to bones of varying sizes and may be operated to release the bone upon completion of the operations being performed thereon. Through the use of the pivoted fixed jaw and the wide opening movable jaw, the bone may be laterally inserted or even slightly tipped when inserted and yet be firmly fixed and held therebetween.

The invention has been described with reference to a particular apparatus for removing the meat from the bone. It is obvious that other meat removing mechanisms could be employed without departing from the spirit of the invention. It is immaterial whether the bone holder remains stationary while the meat removing tool moves therealong or the meat removing tool may be made stationary while the bone holder pulls the bone and meat through the removing tool. Other modifications and variations will be suggested to those skilled in the art without departing from the scope of the invention which is defined by the following claims.

The embodiments of the invention in which an exclusive property or privilege is claimed are defined as follows:

1. A bone holding apparatus comprising:
   a base member;
   a pair of jaws mounted on said base member; gripping means on each of said jaws adapted to hold said one end of a bone placed therebetween; one jaw of said pair being movable toward and away from the other jaw of said pair for forcing a bone against the gripping means of said other jaw of said pair thereby clamping said bone between said jaws; said other jaw of said pair being of a shape to encompass at least a portion of a bone held therein and being freely pivotally mounted on said base member relative to said one jaw of said pair, the pivotal mounting thereof being about an axis extending transverse to the direction of movement of said one jaw and through an area located between the two jaws permitting said other jaw to pivot to different positions locating the gripping means of said other jaw at differently spaced distances from a plane on which said axis is located and which extends generally in the same direction as the medial axis of said bones to be held therein, whereby said jaws automatically adjust to bones of varying sizes; and
   driven actuator means for moving and forcing said one jaw toward said other jaw to thereby hold and restrain said bone from longitudinal and rotational movement.

2. A bone holding apparatus as described in claim 1 wherein said other jaw forms an arc and encompasses at least a portion of a bone held therein.

3. The bone holding apparatus as described in claim 1 wherein said movable jaw is positioned away from and upwardly with respect to said fixed jaw when in an open position whereby said one end of a bone may be inserted laterally into said holder.

4. The bone holding structure as described in claim 1 wherein said actuator means comprises:
   a cylinder formed within said base member; and
   a piston movable within said cylinder, said movable jaw operably connected to said piston and movable therewith.

5. The bone holding structure as described in claim 4 and further including a connecting rod connected at one end to said piston and movable therewith; and a linking member, said linking member connected to said piston rod and to said movable jaw.

6. The bone holding structures as described in claim 4 wherein said piston in said cylinder forms two independent chambers within said cylinder; and fluid pressure ports connected to said chambers, said piston movable within said cylinder in response to the presence of fluid pressure in said chambers.

7. The bone holding apparatus as described in claim 4 wherein said cylinder has an upper and a lower chamber, each of said chambers being selectively connected to a source of fluid pressure; a cylinder head fixed at the upper chamber of said cylinder and having a depending central portion extending into said upper chamber to define the upper limit of travel of said piston within said cylinder.

8. A bone holding apparatus as described in claim 1 wherein said fixed jaw has a plurality of bone-engaging members fixed thereon.

9. An apparatus for holding a bone in an automatic deboning machine comprising:
   a base member;
   a pair of jaws mounted on said base member, one jaw of said pair being movable toward and away from the other jaw of said pair for forcing a bone against the other jaw of said pair thereby clamping said bone between said jaws, said movable jaw pivotally attached to said base member;
   a piston chamber formed in said base member, said chamber having fluid pressure inlet and outlet ports communicating therewith;
   a piston in said chamber, said piston being movable in response to fluid pressure applied through said ports; and
   linkage means connecting said piston to said movable jaw.

10. A bone holding apparatus as defined in claim 9 and further including serrations on at least one of said jaws to engage an end of said bone as said jaws move toward each other.

11. A bone holding apparatus as described in claim 10 wherein said other jaw forms an arc and encompasses at least a portion of a bone held therein.

12. A bone holding apparatus as described in claim 11 wherein said other jaw is pivotally mounted on said base member.

* * * * *